(12) United States Patent
Inoue et al.

(10) Patent No.: US 8,975,951 B2
(45) Date of Patent: Mar. 10, 2015

(54) SEMICONDUCTOR INTEGRATED CIRCUIT (75) Inventors: Takeshi Inoue, Tokyo (JP); Shinji Takashima, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/009,593

(22) PCT Filed: Apr. 10, 2012

(86) PCT No.: PCT/JP2012/059818
§ 371 (c)(1),
(2), (4) Date: Oct. 3, 2013

(87) PCT Pub. No.: WO2012/141182
PCT Pub. Date: Oct. 18, 2012

(65) Prior Publication Data
US 2014/0022003 A1    Jan. 23, 2014

(30) Foreign Application Priority Data

Apr. 11, 2011 (JP) ................................. 2011-087430
Apr. 11, 2011 (JP) ................................. 2011-087431

(51) Int. Cl.
*G05F 1/10*   (2006.01)
*G05F 1/46*   (2006.01)
*G06F 1/20*   (2006.01)
(Continued)

(52) U.S. Cl.
CPC ......... *G05F 1/463* (2013.01); *H02M 2001/327* (2013.01); *Y02B 60/1275* (2013.01); *G06F 1/206* (2013.01); *G06F 1/3206* (2013.01); *G06F 1/324* (2013.01); *G06F 1/3296* (2013.01)

USPC ........................................... 327/513; 327/350

(58) Field of Classification Search
CPC ................................. G05F 1/462; G05F 1/463
USPC ........................................................... 327/513
See application file for complete search history.

(56) References Cited

U.S. PATENT DOCUMENTS 6,415,388 B1 *  7/2002  Browning et al. ............ 713/322
6,518,823 B1    2/2003  Kawai
(Continued)

FOREIGN PATENT DOCUMENTS

JP    10222253       8/1998
JP    2007165527 A   6/2006
(Continued)

OTHER PUBLICATIONS

International Search Report for corresponding PCT Application PCT/JP2012/059818, dated May 22. 2012.
(Continued)

*Primary Examiner* — Thomas J Hiltunen
(74) *Attorney, Agent, or Firm* — Matthew B. Dernier, Esq.; Gibson & Dernier LLP (57) ABSTRACT

Electronic apparatus that can suppress the operating voltage of an incorporated semiconductor integrated circuit to a low voltage is provided. Electronic apparatus 1 includes a power supply circuit 13, a semiconductor integrated circuit 10 that operates by a supply voltage supplied from the power supply circuit 13, and a temperature sensor 11 that measures the temperature of the semiconductor integrated circuit 10. The power supply circuit 13 decreases the supply voltage according to a rise in the measured temperature.

3 Claims, 3 Drawing Sheets

(51) Int. Cl.
*G06F 1/32* (2006.01)
*H02M 1/32* (2007.01)

(56) References Cited

U.S. PATENT DOCUMENTS

| | | | | |
|---|---|---|---|---|
| 6,815,643 | B2 * | 11/2004 | Der Ropp | 219/209 |
| 7,464,277 | B2 * | 12/2008 | Prosperi et al. | 713/320 |
| 7,887,235 | B2 * | 2/2011 | Campos et al. | 374/178 |
| 8,203,315 | B2 * | 6/2012 | Ladurner et al. | 320/150 |
| 8,209,504 | B2 * | 6/2012 | Nakanishi et al. | 711/156 |
| 8,376,611 | B2 * | 2/2013 | Li et al. | 374/178 |
| 8,456,096 | B2 * | 6/2013 | Kwok et al. | 315/219 |
| 8,575,993 | B2 * | 11/2013 | Penzes et al. | 327/512 |
| 2007/0028125 | A1 | 2/2007 | Kitanaka | |
| 2009/0322409 | A1 * | 12/2009 | Levit et al. | 327/513 |
| 2010/0308893 | A1 * | 12/2010 | Fukuoka | 327/512 |
| 2012/0166839 | A1 * | 6/2012 | Sodhi et al. | 713/322 |
| 2012/0223590 | A1 * | 9/2012 | Low et al. | 307/104 |
| 2013/0175950 | A1 * | 7/2013 | Fang et al. | 315/309 |
| 2013/0293004 | A1 * | 11/2013 | Higuchi et al. | 307/9.1 |

FOREIGN PATENT DOCUMENTS

| | | |
|---|---|---|
| JP | 2007034839 | 2/2007 |
| JP | 2010526380 A | 7/2010 |
| WO | 2006134775 | 12/2006 |

OTHER PUBLICATIONS

International Preliminary Report on Patentability and Written Opinion for corresponding PCT Application PCT/JP2012/059818, dated Oct. 24, 2013.

* cited by examiner

SEMICONDUCTOR INTEGRATED CIRCUIT

CROSS REFERENCE TO RELATED APPLICATIONS

This application claims priority to International Application No. PCT/JP2012/059818, filed Apr. 10, 2012, which claims priority to Japanese Application No's. JP2011-087431, filed Apr. 11, 2011 and JP2011-087430, filed Apr. 11, 2011, the entire disclosures of which are hereby incorporated by reference.

TECHNICAL FIELD

The present invention relates to a semiconductor integrated circuit incorporating a CMOS and electronic apparatus including this semiconductor integrated circuit.

BACKGROUND ART

Semiconductor integrated circuits including a CMOS, such as a central processing unit (CPU) and a SOC (System-on-a-chip), are widely used as components in electronic apparatus (refer to e.g. Patent Document 1).

PRIOR ART DOCUMENT

Patent Document

Patent Document 1: U.S. Pat. No. 6,518,823 Specification

SUMMARY OF INVENTION

In recent years, along with microminiaturization of the CMOS, a tendency different from that of conventional products has come to appear in the temperature dependence of its performance. However, considerations have not yet been sufficiently made about a method for efficiently using the semiconductor integrated circuit according to such a characteristic.

Furthermore, in general, such a semiconductor integrated circuit operates at a constant operating frequency. However, operation at so high an operating frequency is often unnecessary depending on the situation such as the content of processing executed by this semiconductor integrated circuit. In addition, continuation of operation at a high frequency increases the power consumption of the semiconductor integrated circuit. So, a semiconductor integrated circuit that can dynamically change its own operating frequency depending on the situation has made an appearance. Such a semiconductor integrated circuit operates at a high operating frequency depending on the situation. However, when operation at a high frequency is unnecessary, the power consumption can be suppressed by lowering the operating frequency. When the semiconductor integrated circuit changes the operating frequency, a fluctuation in the current due to noise occurs. Here, if the supply voltage supplied to the semiconductor integrated circuit has a value just close to the lower limit voltage that is the minimum necessary for operation after the change in the operating frequency, It can occur that the operating voltage of the semiconductor integrated circuit falls below this lower limit voltage attributed to a temporary voltage decrease due to such a current fluctuation. Therefore, when the operating frequency is changed, the semiconductor integrated circuit needs to be supplied with a voltage higher by at least the amount of voltage decrease that possibly occurs due to noise than the lower limit voltage that is the minimum necessary for operation at the operating frequency after the change.

The present invention is devised in view of the above-described actual condition and one of objects thereof is to provide a semiconductor integrated circuit that the operating voltage can be suppressed to a low voltage, electronic apparatus including this semiconductor integrated circuit, and a control method thereof.

Furthermore, another object of the present invention is to provide a semiconductor integrated circuit that the supply voltage that should be supplied to this semiconductor integrated circuit can be suppressed to a low voltage when the operating frequency is changed, a control method thereof, and electronic apparatus including this semiconductor integrated circuit.

Electronic apparatus according to one aspect of the present invention includes a power supply circuit, a semiconductor integrated circuit that operates by a supply voltage supplied from the power supply circuit, and a temperature sensor that measures temperature of the semiconductor integrated circuit, characterized in that the power supply circuit decreases the supply voltage according to a rise in the measured temperature.

Furthermore, a control method of electronic apparatus according to one aspect of the present invention is a control method of electronic apparatus including a power supply circuit, a semiconductor integrated circuit that operates by a supply voltage supplied from the power supply circuit, and a temperature sensor that measures temperature of the semiconductor integrated circuit, the control method being characterized by including a step of acquiring the measured temperature, and a step of decreasing the supply voltage supplied to the semiconductor integrated circuit by the power supply circuit according to a rise in the acquired temperature.

In addition, a semiconductor integrated circuit according to one aspect of the present invention is a semiconductor integrated circuit that operates by a supply voltage supplied from a power supply circuit, the semiconductor integrated circuit being characterized by including a temperature sensor that measures temperature of the semiconductor integrated circuit, and a request section that requests the power supply circuit to decrease the supply voltage according to a rise in the measured temperature.

Moreover, a semiconductor integrated circuit according to another aspect of the present invention is a semiconductor integrated circuit that operates by a supply voltage supplied from a power supply circuit, the semiconductor integrated circuit including a frequency change section that changes an operating frequency from an initial frequency to a target frequency, and a supply voltage change section that requests the power supply circuit to change the supply voltage to a target voltage determined according to the target frequency when the operating frequency is changed, characterized in that the frequency change section carries out the change from the initial frequency to the target frequency in a stepwise manner in a plurality of times.

Furthermore, a control method of a semiconductor integrated circuit according to one aspect of the present invention is a control method of a semiconductor integrated circuit that operates by a supply voltage supplied from a power supply circuit, the control method including a frequency change step of changing an operating frequency from an initial frequency to a target frequency, and a supply voltage change step of requesting the power supply circuit to change the supply voltage to a target voltage determined according to the target frequency when the operating frequency is changed, characterized in that the change from the initial frequency to the target frequency is carried out in a stepwise manner in a plurality of times in the frequency change step.

Moreover, electronic apparatus according to another aspect of the present invention is electronic apparatus including a power supply circuit and a semiconductor integrated circuit that operates by a supply voltage supplied from the power supply circuit, the electronic apparatus being characterized in that the semiconductor integrated circuit includes a frequency change section that changes an operating frequency from an initial frequency to a target frequency, and a supply voltage change section that requests the power supply circuit to change the supply voltage to a target voltage determined according to the target frequency when the operating frequency is changed, the power supply circuit changes the supply voltage to the target voltage in response to a request of the supply voltage change section, and the frequency change section carries out the change from the initial frequency to the target frequency in a stepwise manner in a plurality of times.

MODES FOR CARRYING OUT THE INVENTION

Electronic apparatus according to one embodiment of the present invention is characterized by including a power supply circuit, a semiconductor integrated circuit that operates by a supply voltage supplied from the power supply circuit, and a temperature sensor that measures the temperature of the semiconductor integrated circuit. The power supply circuit decreases the supply voltage according to a rise in the measured temperature.

In the electronic apparatus, the power supply circuit may decrease the supply voltage by a predetermined decrease amount when the measured temperature has become equal to or higher than a predetermined threshold.

Furthermore, a semiconductor integrated circuit according to one embodiment of the present invention is a semiconductor integrated circuit that operates by a supply voltage supplied from a power supply circuit. It is characterized by including a frequency change section that changes an operating frequency from an initial frequency to a target frequency, and a supply voltage change section that requests the power supply circuit to change the supply voltage to a target voltage determined according to the target frequency when the operating frequency is changed. The frequency change section carries out the change from the initial frequency to the target frequency in a stepwise manner in a plurality of times.

In the semiconductor integrated circuit, the number of times of change in the change in the operating frequency from the initial frequency to the target frequency by the frequency change section may be determined according to both of the initial frequency and the target frequency.

Moreover, in the semiconductor integrated circuit, the frequency change section may carry out the change to the target frequency through changing the operating frequency to one or a plurality of intermediate frequencies determined according to both of the initial frequency and the target frequency in a stepwise manner.

An embodiment of the present invention will be described in detail below based on the drawings.

[Configuration of Electronic Apparatus]

Figure 1:
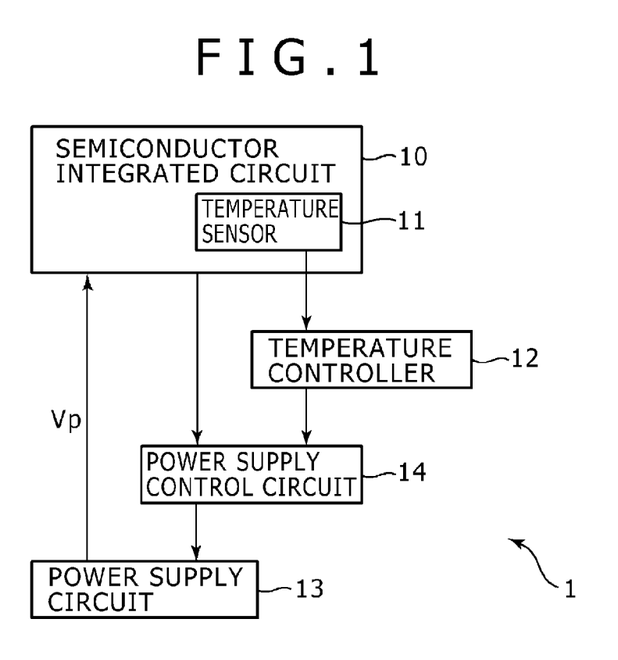
FIG. 1 is a schematic configuration diagram of electronic apparatus including a semiconductor integrated circuit according to an embodiment of the present invention.

FIG. 1 is a configuration diagram showing the schematic circuit configuration of electronic apparatus 1 including a semiconductor integrated circuit 10 according to one embodiment of the present invention. The electronic apparatus 1 is so configured as to include the semiconductor integrated circuit 10, a temperature sensor 11, a temperature controller 12, a power supply circuit 13, and a power supply control circuit 14.

The semiconductor integrated circuit 10 is an integrated circuit that is so configured as to include a CMOS (Complementary Metal Oxide Semiconductor) and may be e.g. CPU, SOC, etc. The semiconductor integrated circuit 10 operates by a supply voltage Vp supplied from the power supply circuit 13. In the following, the semiconductor integrated circuit 10 is considered an arithmetic device that executes various kinds of information processing in accordance with a program stored in a built-in memory or an external memory. The semiconductor integrated circuit 10 is capable of internally changing its own operating frequency f according to the content of operation thereof (here, the content of the program to be run). When changing its own operating frequency f, the semiconductor integrated circuit 10 outputs, to the power supply control circuit 14, an instruction for varying the supply voltage Vp according to this change.

Furthermore, the temperature sensor 11 is incorporated in the semiconductor integrated circuit 10. The temperature sensor 11 measures the temperature of the semiconductor integrated circuit 10 and outputs an electrical signal indicating the result to the temperature controller 12.

The temperature controller 12 receives the signal output by the temperature sensor 11 and outputs, to the power supply control circuit 14, information representing the temperature T of the semiconductor integrated circuit 10 required according to this received signal.

The power supply circuit 13 is so configured as to include e.g. an IC for power supply functioning as a switching regulator and so forth. It converts power supplied by a power supply source outside the electronic apparatus 1 (e.g. commercial AC power supply or USB host apparatus) or a battery incorporated in the electronic apparatus 1 to a given voltage and supplies it to the respective sections in the electronic apparatus 1. In particular, the power supply circuit 13 supplies power to the semiconductor integrated circuit 10 with the supply voltage Vp in accordance with an instruction input from the power supply control circuit 14.

The power supply control circuit 14 is a circuit that controls the operation of the power supply circuit 13 and is configured by a microcomputer or the like. In the present embodiment, the power supply control circuit 14 determines the supply voltage Vp based on the instruction according to change in the operating frequency f input from the semiconductor integrated circuit 10 and/or the information representing the temperature T of the semiconductor integrated circuit 10 input from the temperature controller 12, and instructs the power supply circuit 13 to supply power to the semiconductor integrated circuit 10 with this determined supply voltage Vp.

[Change in Operating Frequency]

Next, control when the semiconductor integrated circuit 10 changes the operating frequency f in the present embodiment will be described.

In general, the lower limit value of the supply voltage Vp that should be supplied to the semiconductor integrated circuit 10 (value of the minimum necessary voltage for making the semiconductor integrated circuit 10 normally operate) changes according to the operating frequency f. That is, the higher the operating frequency f becomes, the larger the value of the necessary supply voltage Vp also becomes. So, to suppress the power consumption of the semiconductor integrated circuit 10, it is desirable that, in the case of dynamically changing the operating frequency f, the supply voltage Vp is also changed in association with it, and the supply voltage Vp that is as close to the lower limit value as possible is supplied to the semiconductor integrated circuit 10 both before and after the change in the operating frequency f. Specifically, when the semiconductor integrated circuit 10 changes the operating frequency f from an initial frequency f1 to a target frequency f2 (>f1), the supply voltage Vp is also changed from an initial voltage Vp1 corresponding to the initial frequency f1 to a target voltage Vp2 (>Vp1) corresponding to the target frequency f2. Hereinafter, the lower limit value of the minimum necessary voltage for stable operation of the semiconductor integrated circuit 10 at the target frequency f2 is defined as a lower limit voltage Vl.

Here, if the target voltage Vp2 is set to a value almost equal to the lower limit voltage Vl, it can occur that the current flowing in the semiconductor integrated circuit 10 fluctuates due to noise occurring in the semiconductor integrated circuit 10 in association with the change in the operating frequency f and the supply voltage Vp falls below the lower limit voltage Vl. Thus, the power supply control circuit 14 sets the target voltage Vp2 to a value larger than the lower limit voltage Vl. That is, the target voltage Vp2 needs to be set to a value represented by Vp2=Vl+α. Here, the value of α is determined in consideration of the amount of fluctuation in the supply voltage Vp due to the noise. However, if the supply voltage Vp higher than the lower limit voltage Vl is supplied to the semiconductor integrated circuit 10 in this manner, the power consumption of the semiconductor integrated circuit 10 increases correspondingly.

So, in the present embodiment, the semiconductor integrated circuit 10 changes the operating frequency f in a stepwise manner through one or plural intermediate frequencies fm (f1<fm<f2) by dividing the change from the initial frequency f1 to the target frequency f2 into plural times. This can diminish the voltage fluctuation occurring due to the noise. Thus, the value of α can be decreased compared with the case in which the change from the initial frequency f1 to the target frequency f2 is carried out at one time.

Figure 2A:
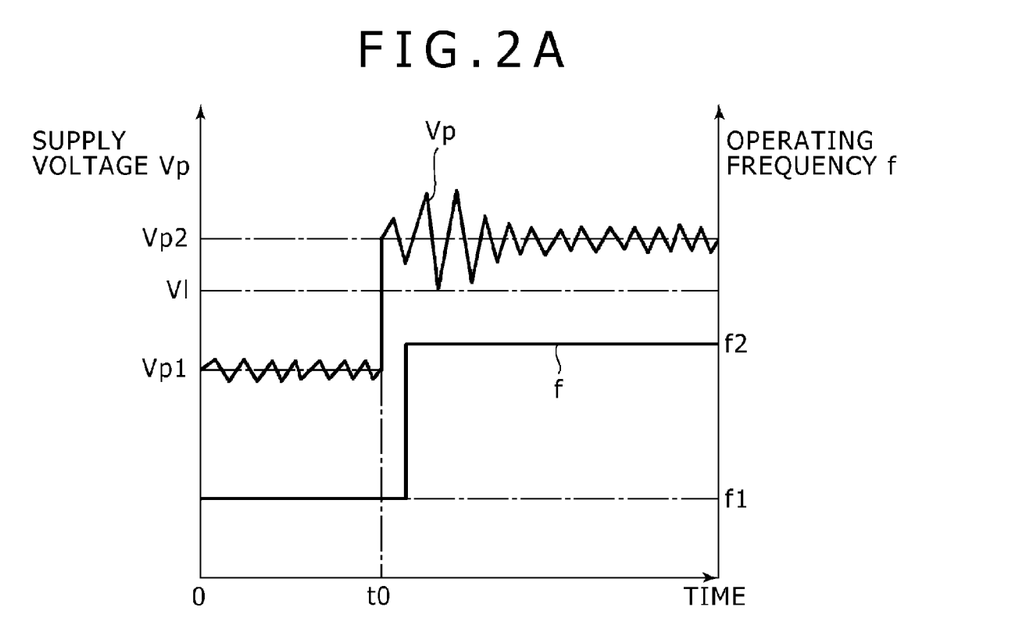
FIG. 2A is a diagram schematically showing time change of an operating frequency f and a supply voltage Vp at the time of change in the operating frequency f in a conventional example.
Figure 2B:
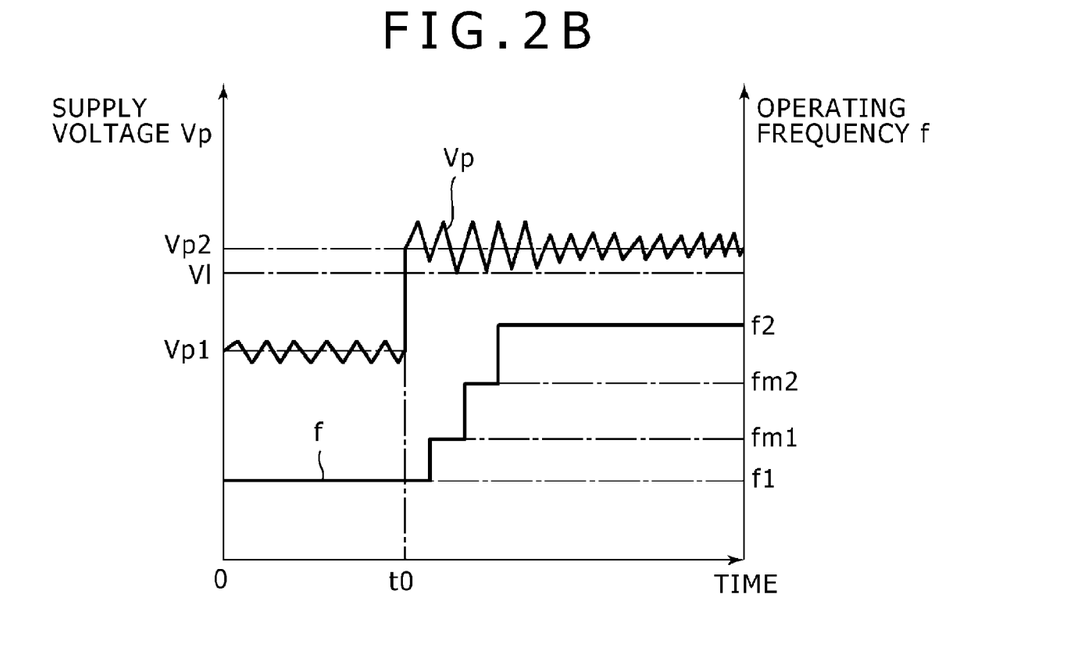
FIG. 2B is a diagram schematically showing time change of the operating frequency f and the supply voltage Vp at the time of change in the operating frequency f in the present embodiment.

FIG. 2A and FIG. 2B are diagrams for comparing voltage control in a conventional example at the time of change in the operating frequency f and voltage control in the present embodiment. FIG. 2A schematically shows time change in the operating frequency f and the supply voltage Vp in the conventional example and FIG. 2B schematically shows time change in the operating frequency f and the supply voltage Vp in the present embodiment. In both diagrams, the abscissa indicates the time and time t0 indicates the timing of change from the initial voltage Vp1 to the target voltage Vp2. Furthermore, the ordinate indicates the magnitude of the supply voltage Vp and the operating frequency f. As shown in FIG. 2A, if the change from the initial frequency f1 to the target frequency f2 is carried out at one time, the supply voltage Vp fluctuates comparatively greatly due to noise after the frequency change. Therefore, the target voltage Vp2 is set to a comparatively large value so that the supply voltage Vp after such a fluctuation may be prevented from falling below the lower limit voltage Vl. In contrast, in FIG. 2B, the change from the initial frequency f1 to the target frequency f2 is so carried out as to be divided into three times. Specifically, the operating frequency f is changed in a stepwise manner, first from the initial frequency f1 to a first intermediate frequency fm1, next from the first intermediate frequency fm1 to a second intermediate frequency fm2, and moreover from the second intermediate frequency fm2 to the target frequency f2. This way, at each of the plural times of change, the ratio of the frequency after the change to the frequency before the change is relatively small compared with the case in which the frequency is changed at one time. Thus, the fluctuation in the supply voltage Vp occurring due to the noise is also small correspondingly. Therefore, although the target voltage Vp2 is set lower compared with the example of FIG. 2A, the supply voltage Vp can be prevented from falling below the lower limit voltage Vl.

As is apparent from FIG. 2B, in the present embodiment, first the supply voltage Vp is changed only one time and thereafter the operating frequency f is changed plural times. In general, the change in the supply voltage Vp requires a long time because being carried out by controlling the power supply circuit 13 outside the semiconductor integrated circuit 10. In contrast, the change in the operating frequency f does not require so long a time because being internally carried out by the semiconductor integrated circuit 10 itself. In the present embodiment, although the number of times of change in the operating frequency f increases compared with the conventional example, the number of times of change in the supply voltage Vp is one, which is the same as the conventional example. Therefore, the time required for the change from the initial frequency f1 to the target frequency f2 is hardly different from the conventional example. If so long a time is not required for the change in the supply voltage Vp, the supply voltage Vp may also be changed in a stepwise manner in plural times in conjunction with the stepwise change in the operating frequency f.

Here, a description will be made about how many times the change in the operating frequency f should be so carried out as to be divided into and how to determine each of the one or plural intermediate frequencies fm when the change from the initial frequency f1 to the target frequency f2 is carried out.

If the number of times of change in the operating frequency f when change from the certain initial frequency f1 to the certain target frequency f2 is carried out is defined as N times, the semiconductor integrated circuit 10 changes the operating frequency f through (N−1) intermediate frequencies fm. The intermediate frequencies fm in this case should be so determined that variation in the magnitude of noise occurring due to the change of each time is made as small as possible. Here, the magnitude of the noise occurring attributed to one time of change determines depending on the ratio of the operating frequencies f between before and after the change. Therefore, if the intermediate frequency fm to which the operating frequency f should be set by the n-th round of change (n is a natural number of 1 to N−1) is represented as fm(n), ideally the intermediate frequency fm(n) is obtained by the following calculation expression.

$$fm(n) = f1 \cdot \left(\frac{f2}{f1}\right)^{\frac{n}{N}} \quad \text{[Expression 1]}$$

According to such a calculation expression, the operating frequency f of the semiconductor integrated circuit 10 starts from the initial frequency f1 and increases in geometric progression to the target frequency f2 through (N−1) intermediate frequencies fm(n). Actually there is often a restriction on the value of the operating frequency f to which change can be made by the semiconductor integrated circuit 10. However, at this time, a value close to the value obtained by the above-described calculation expression among the operating frequencies f to which change can be made is set.

When the intermediate frequency fm(n) is determined, the value that should be set as the target voltage Vp2 is also determined according to this. According to the above-described calculation expression, in the change per one time, the operating frequency f increases to the frequency that is (f2/f1)$^{(1/N)}$ times that before the change. The manufacturer of the electronic apparatus 1 can acquire information relating to how much a voltage drop occurs in association with such change in the operating frequency f by e.g. a method of performing measurement by using a prototype in advance, or the like. Then, the target voltage Vp2 can be determined by determining the value of a by using this information.

Figure 3:
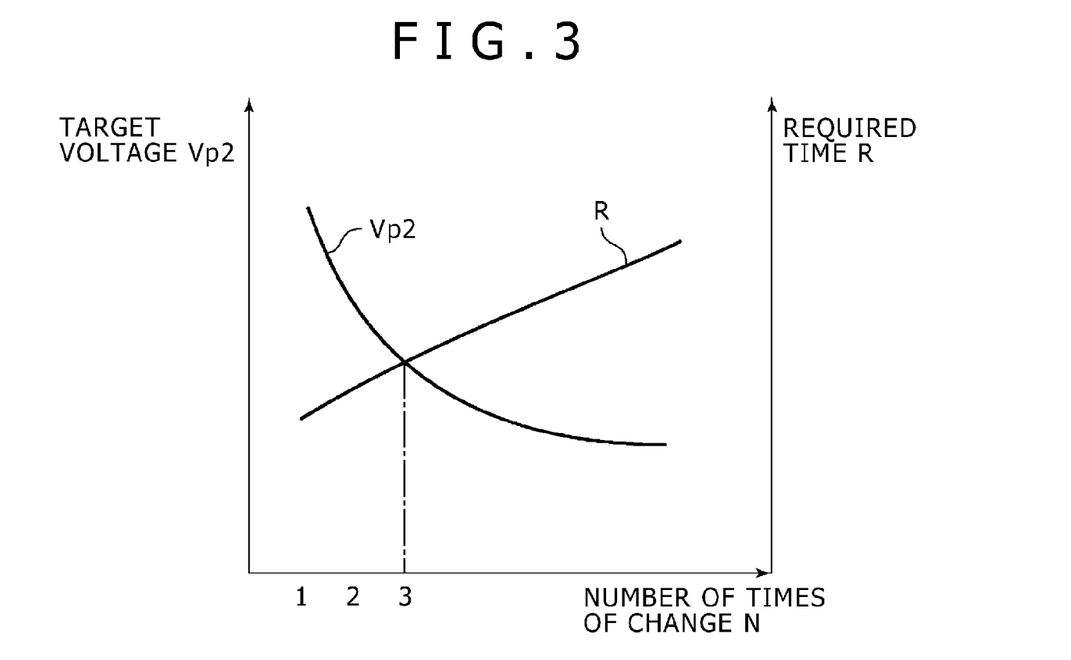
FIG. 3 is a graph showing the relationship among the number N of times of change at the time of change in the operating frequency f, required time R for this change, and a target voltage Vp2.

Moreover, how many times the change from the initial frequency f1 to the target frequency f2 should be so carried out as to be divided into can be determined as follows. FIG. 3 is a graph showing the relationship among the number N of times of change when the operating frequency f is changed from the initial frequency f1 to the target frequency f2, required time R for this change, and the target voltage Vp2. As shown in this diagram, as the number N of times of change is increased, the total required time R for the change in the operating frequency f extends. Meanwhile, increasing the number N of times of change can diminish the change width of the operating frequency f per one time and thus can correspondingly decrease the target voltage Vp2. However, as is understood from the diagram, when the number N of times of change is larger than a certain level, the decrease rate of the target voltage Vp2 does not become so high even when the number N of times of change is further increased. So, the number N of times of change needs to be determined based on balance between what degree the target voltage Vp2 is desired to be suppressed to and what range the required time R for the change is desired to be limited to. In the example of FIG. 3, the curve showing the relationship between the number N of times of change and the required time R and the curve showing the relationship between the number N of times of change and the target voltage Vp2 intersect near the number of times of change=three. Therefore, the number N of times of change is set to three if balancing the short required time R and the low target voltage Vp2 is desired. Alternatively, another number of times of change may be employed with more emphasis put on either the required time R or the target voltage Vp2.

The values that should be set as the target voltage Vp2 and the intermediate frequency fm need to be determined for each combination of the initial frequency f1 and the target frequency f2. These values may be recorded in the semiconductor integrated circuit 10 in advance at the time of factory shipment of the electronic apparatus 1. When changing the operating frequency f from the certain initial frequency f1 to the certain target frequency f2, the semiconductor integrated circuit 10 outputs, to the power supply control circuit 14, the value of the target voltage Vp2 recorded in connection with this combination of the initial frequency f1 and the target frequency f2 to thereby request the power supply circuit 13 to supply power with this target voltage Vp2. Thereafter, the semiconductor integrated circuit 10 carries out the change in the operating frequency f in N times in such a manner that the operating frequency f goes through (N−1) intermediate frequencies fm recorded in connection with this combination of the initial frequency f1 and the target frequency f2. This can suppress the occurrence of noise accompanying the change in the operating frequency f and set the target voltage Vp2 low.

So far, a description is made particularly about control in the case of carrying out change to increase the operating frequency f. In terms of decreasing the supply voltage Vp in order to suppress the power consumption, the operating frequency f does not necessarily need to be changed in plural times as described above in the case of carrying out change to decrease the operating frequency f. However, in the semiconductor integrated circuit 10, not only the lower limit voltage Vl but an upper limit voltage Vu according to the operating frequency f is often set. In this case, in order to make the semiconductor integrated circuit 10 normally operate, application of a voltage surpassing this upper limit voltage Vu needs to be prevented. However, if the operating frequency f is greatly changed at one time, it can occur that the supply voltage Vp temporarily surpasses the upper limit voltage Vu due to noise occurring in association with the change in the operating frequency f. If the upper limit voltage Vu is a value that changes depending on the operating frequency f, also in the case of carrying out change to decrease the operating frequency f, the supply voltage Vp after the change will surpass the upper limit voltage Vu. So, the semiconductor integrated circuit 10 may carry out change to the target frequency f2 in plural times also in the case of carrying out change to decrease the operating frequency f. The number N of times of change and the intermediate frequency fm in this case may both be determined similarly to the above-described case of increasing the operating frequency f. Furthermore, the target voltage Vp2 after the change is set to a value lower than the upper limit voltage Vu by at least the value expected as the fluctuation due to noise.

Although it is explained that the power supply control circuit 14 controls the supply voltage Vp of the power supply circuit 13 in the above description, the semiconductor integrated circuit 10 may directly control the supply voltage Vp of the power supply circuit 13. Furthermore, the temperature sensor 11 and the temperature controller 12 are not always necessary only for carrying out the above-described change control of the operating frequency f.

[Voltage Control According to Temperature]

The power supply control circuit 14 may change the supply voltage Vp supplied to the semiconductor integrated circuit 10 by the power supply circuit 13 according to temperature change of the semiconductor integrated circuit 10 measured by the temperature sensor 11. In particular, in the present embodiment, control to decrease the supply voltage Vp according to a temperature rise of the semiconductor integrated circuit 10 is carried out. This will be described below.

Figure 4:
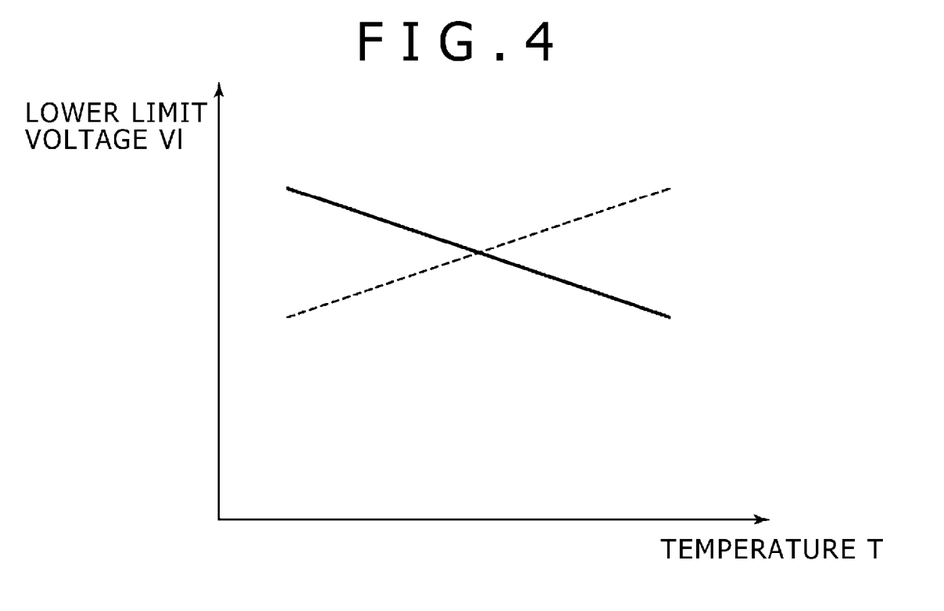
FIG. 4 is a graph schematically showing the relationships between a lower limit voltage Vl of the operating frequency f and a temperature T.

Based on the characteristic of the CMOS used in the semiconductor integrated circuit 10, the lower limit voltage Vl corresponding to the above-described operating frequency f changes depending on the temperature T. FIG. 4 is a graph schematically showing the relationships between this lower limit voltage Vl and the temperature T. The dashed line indicates the characteristic of a conventional CMOS in which the gate length surpasses 65 nm and the solid line indicates the characteristic of a CMOS of recent years in which the gate length is equal to or shorter than 65 nm. Specifically, in the CMOS, the mobility and the threshold voltage, which are parameters that determine its performance, have temperature dependence. Regarding the mobility, the performance deteriorates as the temperature becomes higher. Regarding the threshold voltage, the performance is enhanced as the temperature becomes higher. In the conventional CMOS in which the gate length surpasses 65 nm, the influence of the mobility is dominant and therefore there is a tendency that the performance deteriorates when the temperature becomes high. That is, in the semiconductor integrated circuit including such a CMOS, as shown by the dashed line in FIG. 4, the lower limit voltage Vl is higher when the temperature is higher than when the temperature is lower even when the semiconductor integrated circuit operates at the same operating frequency. Consequently, when the semiconductor integrated circuit including such a CMOS is used under a high-temperature environment, it needs to be made to operate by the comparatively high supply voltage Vp. However, in recent years, along with microminiaturization of the CMOS, a tendency different from the past has come to be seen also in the temperature dependence of the performance of the CMOS. Specifically, in the CMOS that has made an appearance in recent years and has a gate length equal to or shorter than 65 nm, the influence of the threshold voltage becomes dominant when the temperature becomes high and a tendency that the performance is enhanced when the temperature becomes high has come to be seen. Therefore, the semiconductor integrated circuit including such a CMOS with a short gate length has a tendency that the lower limit voltage Vl becomes lower as the temperature becomes higher as shown by the solid line in FIG. 4.

So, the electronic apparatus 1 according to the present embodiment is supposed to decrease the supply voltage Vp supplied to the semiconductor integrated circuit 10 according to a temperature rise of the semiconductor integrated circuit 10. Specifically, for example the power supply control circuit 14 instructs the power supply circuit 13 to decrease the supply voltage Vp by a predetermined decrease amount β when the temperature T of the semiconductor integrated circuit 10 indicated by information output by the temperature controller 12 has become equal to or higher than a predetermined threshold Tth. The value of β in this case is recorded in the power supply control circuit 14 in advance. Furthermore, the power supply control circuit 14 returns the supply voltage Vp to the value before the decrease (i.e. increases the supply voltage Vp by β) when the temperature T has become lower than the predetermined threshold Tth.

Figure 5:
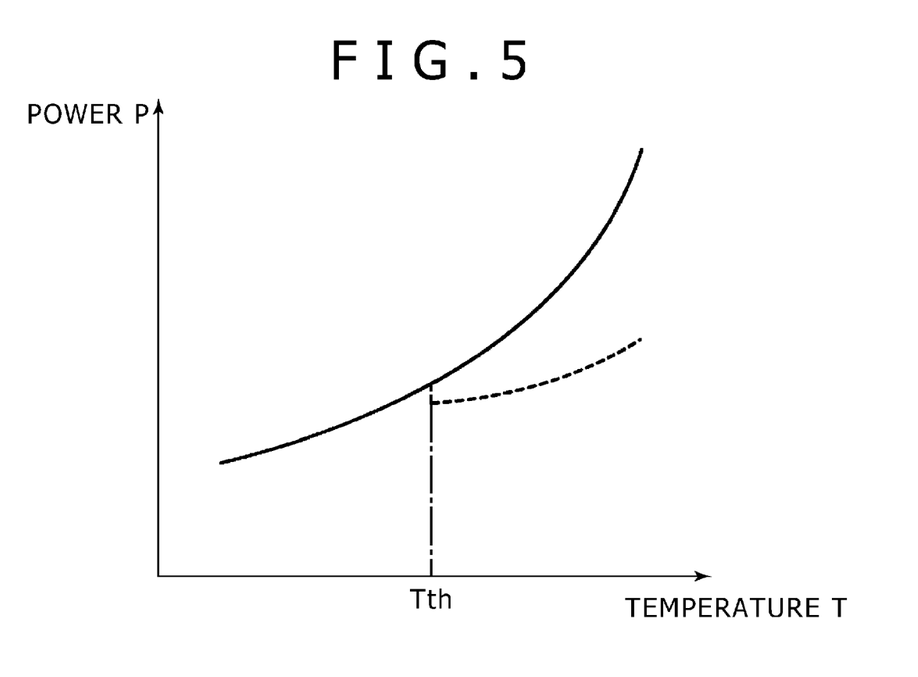
FIG. 5 is a graph for comparison of the power consumption between when voltage control according to the temperature is carried out and when it is not carried out.

FIG. 5 is a graph for comparison of the power consumption between when such control is carried out and when it is not carried out. The abscissa indicates the temperature T and the ordinate indicates power P. Furthermore, the solid line shows the case in which the change control of the supply voltage Vp in association with a temperature rise is not carried out and the dashed line shows the case in which the change control is carried out. In the example of this diagram, the power supply circuit 13 is supposed to decrease the supply voltage Vp by 0.5 V when the temperature has become equal to or higher than the threshold Tth, and it turns out that, as a result, the power consumption of the semiconductor integrated circuit 10 is greatly suppressed in the region in which the temperature T is equal to or higher than the threshold Tth.

Although the number of thresholds Tth is only one in the example of FIG. 5, plural thresholds Tth may be set. For example, in the case of setting the threshold Tth every 20 degrees, the power supply control circuit 14 decreases the supply voltage Vp in a stepwise manner every time the temperature of the semiconductor integrated circuit 10 rises by 20 degrees. In this case, the decrease amounts β of the supply voltage Vp may be values different from each other corresponding to each of the plural thresholds Tth. This allows the supply voltage Vp to be changed to the optimum value in association with the rise in the temperature T even when the lower limit voltage Vl non-linearly changes in response to the rise in the temperature T.

Furthermore, it is desirable that the value of β in decreasing the supply voltage Vp is set with a margin. For example, if the threshold Tth is 50° C., when the temperature T has become equal to or higher than 50° C., the power supply control circuit 14 changes the supply voltage Vp so that it may become at least the lower limit voltage Vl when the temperature of the semiconductor integrated circuit 10 is (50-γ) degrees. The value of this γ is determined according to e.g. the measurement error of the temperature sensor 11. This allows the power supply circuit 13 to supply the voltage necessary for the operation of the semiconductor integrated circuit 10 even when there is the measurement error of the temperature sensor 11 and so forth. Furthermore, when it is detected that the temperature T has become equal to or higher than the threshold Tth, the power supply control circuit 14 may change the supply voltage Vp after waiting for the elapse of predetermined time instead of immediately changing the supply voltage Vp. Alternatively, the power supply control circuit 14 may change the supply voltage Vp at the timing determined depending on the operation status of the semiconductor integrated circuit 10. Specifically, the following way may be employed. Specifically, when the processing burden of the semiconductor integrated circuit 10 is smaller than a predetermined value, the temperature T tends not to rise so greatly. Therefore, even when the temperature T has become equal to or higher than the threshold Tth, the power supply control circuit 14 decreases the supply voltage Vp after continuation of the state in which the temperature T is equal to or higher than the threshold Tth for at least predetermined time instead of immediately decreasing the supply voltage Vp. Conversely, the power supply control circuit 14 immediately deceases the supply voltage Vp if the processing burden of the semiconductor integrated circuit 10 is equal to or larger than the predetermined value at the timing when the temperature T has become equal to or higher than the threshold Tth.

Although it is explained that the temperature sensor is incorporated in the semiconductor integrated circuit 10 itself in the above description, the temperature sensor 11 may be disposed outside the semiconductor integrated circuit 10. In this case, the measurement accuracy of the temperature T is lower than that when the temperature sensor 11 is disposed inside the semiconductor integrated circuit 10. However, if the measurement result of the temperature sensor 11 and the actual temperature of the semiconductor integrated circuit 10 are investigated in advance and the threshold Tth and the decrease amount β are determined according to the result, control to decrease the supply voltage Vp according to a temperature rise of the semiconductor integrated circuit 10 can be realized similarly to the case in which the temperature sensor 11 is disposed inside the semiconductor integrated circuit 10.

Furthermore, in the above description, the temperature controller 12 is explained to output information relating to the temperature T directly to the power supply control circuit 14. However, instead of this, the temperature controller 12 may output the information relating to the temperature T to the semiconductor integrated circuit 10. In this case, the semiconductor integrated circuit 10 itself determines whether or not the temperature T has become equal to or higher than the threshold Tth and outputs, to the power supply control circuit 14, a request to change the supply voltage Vp according to the determination result.

The control at the time of change in the operating frequency f and the control of the supply voltage Vp depending on the temperature, which are described above, may be each carried out independently or may be carried out in combination with each other. In the case of combining them, at the time of change in the operating frequency f, the supply voltage Vp after the change can be determined by subtracting the decrease amount β determined depending on the temperature T at the relevant timing from the target voltage Vp2 determined depending on the target frequency f2 after the change.

The invention claimed is:

1. Electronic apparatus comprising:
   a power supply circuit;
   a semiconductor integrated circuit that operates by a supply voltage supplied from the power supply circuit; and
   a temperature sensor that measures temperature of the semiconductor integrated circuit,
   wherein the power supply circuit decreases the supply voltage according to a rise in the measured temperature while maintaining the operating frequency unchanged in accordance with a timing profile whereby: (i) the power supply circuit decreases the supply voltage substantially immediately upon detecting that the measured temperature has become equal to or higher than a predetermined temperature threshold, when a processing burden on the semiconductor integrated circuit is equal to or higher than a predetermined processing threshold, and (ii) the power supply circuit decreases the supply voltage upon detecting that the measured temperature has become equal to or higher than the predetermined temperature threshold and after a timing delay has passed, when the processing burden on the semiconductor integrated circuit is below the predetermined processing threshold.

2. A control method of electronic apparatus including
   a power supply circuit,
   a semiconductor integrated circuit that operates by a supply voltage supplied from the power supply circuit, and
   a temperature sensor that measures temperature of the semiconductor integrated circuit, the control method comprising:
   a step of acquiring the measured temperature; and
   a step of decreasing the supply voltage supplied to the semiconductor integrated circuit by the power supply circuit according to a rise in the acquired temperature while maintaining the operating frequency unchanged in accordance with a timing profile whereby: (i) the power supply circuit decreases the supply voltage substantially immediately upon detecting that the measured temperature has become equal to or higher than a predetermined temperature threshold, when a processing burden on the semiconductor integrated circuit is equal to or higher than a predetermined processing threshold, and (ii) the power supply circuit decreases the supply voltage upon detecting that the measured temperature has become equal to or higher than the predetermined temperature threshold and after a timing delay has passed, when the processing burden on the semiconductor integrated circuit is below the predetermined processing threshold.

3. A semiconductor integrated circuit that operates by a supply voltage supplied from a power supply circuit, the semiconductor integrated circuit, comprising:
   a temperature sensor that measures temperature of the semiconductor integrated circuit; and
   a request section that requests the power supply circuit to decrease the supply voltage according to a rise in the measured temperature while maintaining the operating frequency unchanged in accordance with a timing profile whereby: (i) the power supply circuit decreases the supply voltage substantially immediately upon detecting that the measured temperature has become equal to or higher than a predetermined temperature threshold, when a processing burden on the semiconductor integrated circuit is equal to or higher than a predetermined processing threshold, and (ii) the power supply circuit decreases the supply voltage upon detecting that the measured temperature has become equal to or higher than the predetermined temperature threshold and after a timing delay has passed, when the processing burden on the semiconductor integrated circuit is below the predetermined processing threshold.

* * * * *